Patented June 10, 1952

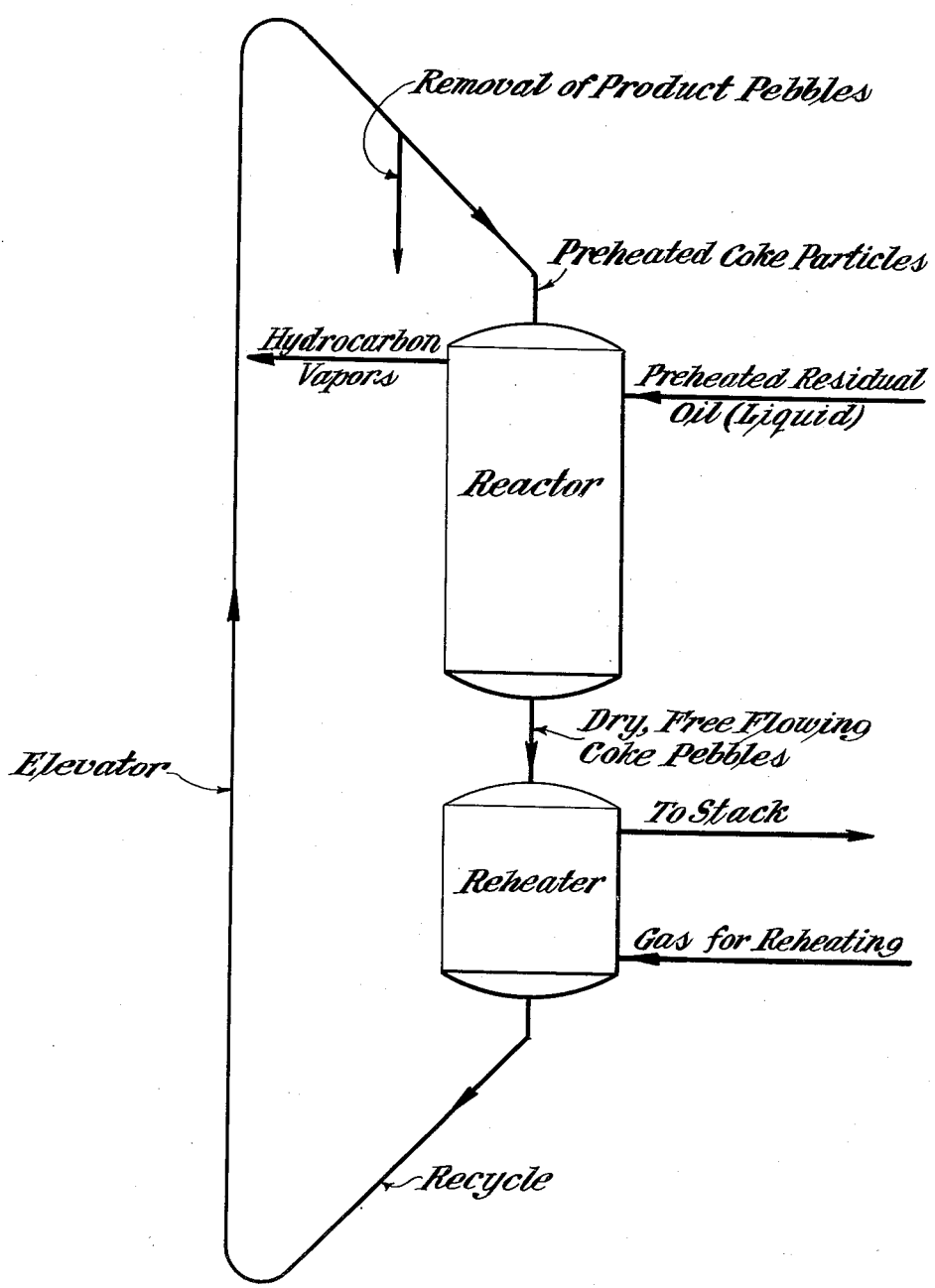

2,600,078

UNITED STATES PATENT OFFICE 2,600,078

HEAT TRANSFER PEBBLE

August H. Schutte, Hastings-on-Hudson, and Vernon O. Bowles, Rye, N. Y., assignors to The Lummus Company, New York, N. Y., a corporation of Delaware Application August 25, 1948, Serial No. 46,168

6 Claims. (Cl. 202—14)

The present invention relates to coke pebbles and to a process for preparing the same. More particularly, this invention pertains to a coke pebble adapted for use in high rate heat exchange operations where inertness, refractoriness and durability are essential.

In recent years several processes have been developed for the heating of inert or reactant vapors to high temperature by contacting them with recirculated and reheated solid particles. These particles have been of ceramic, refractory nature or composed of carborundum, alumina, magnesia, or silica. In the reheating zone of such processes the particles are subjected to rapid absorption of radiant and convection heat. As a result, unless the conditions are carefully controlled, or unless very expensive super-refractory materials are employed, the extreme temperature difference established between the outer surface and the interior of the individual particles results in either fusion of the surfaces or spalling and breakage of the particles. The specially manufactured coke pebble of this invention, although generally suitable for the same purpose, finds especial applicability in chemical reactions where a non-catalytic material with a high heat conductivity and high temperature of fusion is required for heat transfer. One example of such a reaction is the production of ethylene by the cracking of hydrocarbons.

Ordinary petroleum coke unless treated by our process is unsatisfactory due to its softness and crumbly, friable structure and low bulky density. If an attempt were made to recirculate ordinary petroleum coke in commercial apparatus it would be rapidly reduced to fines.

The coke pebble of this invention is a true hydrocarbon coke characterized generally by its dense, non-porous structure and hardness. As produced by preferred procedure, these coke pebbles are of quite regular, rounded contour, are fairly smooth in appearance, and usually range from ¼ inch to 1½ inches in major dimension. They represent a cheap, strong coke material which does not change in strength at high temperature, and which has a very low coefficient of expansion, so that it is not subject to thermal shock. In addition, its thermal conductivity is higher than the refractory materials, thus minimizing temperature differences in the particle and internal temperature stress. Its specific heat is higher than that of the refractory materials at high temperature and its bulk density as high as most of the other applicable materials. Being of petroleum origin, there is no low melting point ash present to cause slagging difficulties, as would be the case with coal coke. This product may be termed "equilibrium coke" by reason of its very low volatile content and chemical inertness.

The uniqueness of this specially prepared petroleum product is further characterized by its near-graphitic nature and the free flowing of the hard, rounded particles in bed formation. While all these properties are extremely important where the pebbles are used as a heat transfer medium, the excellent mechanical strength of the particles can also be used to great advantage in imparting superior strength to the cemented aggregate of large metallurgical electrodes.

It is, therefore, the object of this invention to provide for heat exchange and other purposes a coke pebble having the useful and novel combination of properties set forth.

The drawing is a schematic illustration of a cyclic process by which the coke may be processed.

The coke material of the present invention can be produced most advantageously and in pebble form by the following procedure. A preheated, liquid charge of heavy hydrocarbons or residual oils is applied in a closely controlled manner to a continuously moving, gravity packed, bed of preheated particles of low volatile petroleum coke so that a dry, non-agglomerating coke layer is formed on the particles upon passage through a charging zone and further progressive movement through a continuing conversion space, the operation also resulting in removal of the major part of the charge as vapor. The coke pebble of this invention is obtained by successive applications of coke layers in this manner, either by multiple coating in a plurality of charging zones spaced in the direction of bed movement or by repeated recycling of the bed particles through a charging and conversion-reaction space. The general method and further details of treating hydrocarbons for the purpose of removing carbon residue in this manner are described in A. H. Schutte et al. patent application Serial No. 3,747, filed January 22, 1948, now Patent No. 2,561,334, of which this is a continuation-in-part.

It has been found that repeated application of relatively thin and substantially uniform layers in the manner described, instead of completely removing the coating from the coke particles after each reaction, or partially burning them to remove deposited coke before return to the reaction space, will result in relatively large and impermeable pebbles of equilibrium coke having the novel and useful properties previously described.

It is conventional and well known to preheat catalysts and other granular solids such as coke non-combustively by the use of heat exchangers inserted in vessels containing such solids. See Guild Patent No. 2,311,984 and Payne et al. Patent No. 2,403,608.

A further object of this invention resides, therefore, in the provision of a process for preparing such coke pebbles in commercial quantities in an efficient manner.

It is to be understood that this pebble includes a nucleus of low volatile coke, the average size of which may range from 1/16 inch to 1 inch in major dimension. Its apparent density is 1.39 grams per cubic centimeter, and its true density is approximately 1.9 grams per cubic centimeter. These figures relating to physical properties are given by way of example only and are not to be construed as limitations except as may be specified hereinafter.

The initial coating layer is applied under conditions of particle and charge temperatures and rate of hydrocarbon feed such that a large portion of the coke will be deposited on the nucleus particle. The other coating layers are applied successively after the preceding layer is substantially dry and are bonded to each other in a dense, homogeneous structure.

From observation it has been found that these envelope-like, coating layers produce a growth or increase in particle size about 0.001 inch of coating per application of liquid hydrocarbon charge. Under these exemplary coating conditions, the product pebble will ordinarily be the result of at least 65 to 100 coating applications made in the same manner described.

An example of the operating conditions for producing coke pebbles in accordance with this invention, using the petroleum coke particles previously described in detail as bed material, is as follows.

A typical charge:

18° A. P. I. Illinois reduced crude
    Ramsbottom carbon_____wt.%__ 8.6
    20% distillation temp.[1]_____°F__ 775
    50% distillation temp.[1]_____°F__ 985
Charge introduction temperature____ 700°–900°
Oil-solids feed ratio_____ 9 to 15 to 1
Coke inlet temperature_____ 850°–1100°
Average particle residence time for
    complete conversion_____ 5–30 minutes

[1] Vacuum distillation corrected to atmospheric pressure.

The principal physical properties of coke pebbles produced in accordance with this invention have been found to be as follows:

Volatile: 0.5 to 3 wt. %
Average density (bulk, for ½" to 1" particles): greater than 50 lb./ft.³
Crushing strength: ½" particles 300#—¾" particles 400–500#
Appearance: Somewhat irregular, rounded particles of dense, homogeneous structure. Pore size on fractured surface much smaller than coke oven coke or ordinary petroleum coke.

It has been observed that these coke pebbles have relatively smooth, non-porous outer surfaces and are durable and resistant to attrition when used for the indicated purposes. They do not fuse nor pass through a stage of intumescence.

As previously indicated, the coke pebbles are of "regular" rounded configuration, the term regular being used in the general sense of normal or customary smooth pebble shape without sharp projections, rather than to imply symmetry.

There has thus been produced a new article of manufacture consisting of an inert coke material in pebble form that is useful for numerous heat exchange operations and also in the manufacture of metallurgical electrodes. At the same time there has further been provided a novel and economical process for making the same as a valuable by-product from the conversion of relatively heavy hydrocarbons.

Although a petroleum coke nucleus is most satisfactory particularly where a low ash particle is ultimately desired, we have effectively produced a relatively low ash particle using "Koppers" coke oven coke, it being understood that by the repeated saturation and drying of the particle and the production of the firmly bonded coatings in accordance with our disclosed process, a highly dense coke pebble results. If desired for metallurgical purposes the coke pebble may of course be further calcined to minimize the volatile content. In either case, the ash content is usually reduced to less than ½ of 1% after the repeated passage through the reactor.

While there have been described a preferred embodiment of the coke pebble of this invention and a preferred process for the production thereof, it is to be understood that modifications may be made therein without departing from the principles of the invention and the scope of the appended claims.

We claim:

1. The process of making hard, refractory coke pebbles of predetermined size, which comprises successively applying a plurality of coatings of heated heavy hydrocarbons in liquid phase to nucleus particles of low volatile coke of approximate range of from about one-sixteenth to about one inch heated to in the range of 850° to 1100° F. passing downwardly through a reaction space as a continuously moving gravity packed bed, maintaining the coated particles of said bed in the reaction space until the coatings are converted into dry-non-agglomerating coke layers on the particles, removing the particles having dry coke layers from the reaction space, reheating the said removed particles without burning, and repeating the application of coatings in the reaction space and the reheating of the particles in the same manner until the nucleus particles are saturated and the coatings have grown to a predetermined size of about one-quarter to about one and one-half inches in major dimension and the pebbles have become impervious.

2. The process as claimed in claim 1 in which the heavy hydrocarbons are heated to a temperature such that the liquid surrounds the particles and forms an envelope of about 0.001 inch thickness per application.

3. As an article of manufacture and sale, a hard, smooth, impermeable, coke pebble of rounded contour having a major dimension of at least one-quarter inch and a dense homogeneous internal structure formed by successively applying to a coke nucleus particle a series of like coatings of liquid heavy hydrocarbons, each of which coatings is substantially completely dried before another coating is applied; until the nucleus particle is saturated and the coatings have grown to an impermeable coke pebble of the specified size, said pebble being further characterized by an apparent density of the order of 1.39 grams per cubic centimeter, a true density of about 1.9 grams per cubic centimeter, a crushing strength for one-half inch pebbles of about 300 pounds, and a crushing strength for three-quarter inch pebbles of about 400 to 500 pounds.

4. The article of claim 3 in which the pebble is essentially of petroleum origin and has an ash content less than 0.5 percent, and a volatile content of 0.5 to 3.0 percent.

5. The article of claim 4 in which the pebble is refractory.

6. As an article of manufacture and sale, a hard, smooth, impermeable, coke pebble of rounded contour having a dense substantially homogeneous internal structure formed by successively applying to a solid nucleus particle a large number of thin coatings of liquid heavy hydrocarbons, each of which coatings is substantially completely coked before another coating is applied, until the nucleus particle is saturated and the particle has grown rounded and of much larger size and has become essentially homogeneous, said pebble being further characterized by an apparent density of at least 1.39 grams per cubic centimeter, a true density of about 1.9 grams per cubic centimeter, and a high crushing strength.

AUGUST H. SCHUTTE.
VERNON O. BOWLES.

REFERENCES CITED

The following references are of record in the file of this patent:

UNITED STATES PATENTS

| Number | Name | Date |
|---|---|---|
| 1,825,374 | Thiele | Sept. 29, 1931 |
| 2,177,226 | Rice et al. | Oct. 24, 1939 |
| 2,323,501 | Tuttle | July 6, 1943 |
| 2,348,699 | Tuttle | May 9, 1944 |
| 2,362,270 | Hemminger | Nov. 7, 1944 |
| 2,364,492 | Tuttle | Dec. 5, 1944 |
| 2,390,031 | Schutte et al. | Nov. 27, 1945 |
| 2,426,848 | Tuttle | Sept. 2, 1947 |
| 2,443,714 | Arveson | June 22, 1948 |
| 2,511,709 | Hemminger | June 13, 1950 |